F. C. LAME.
COOKING UTENSIL.
APPLICATION FILED MAR. 24, 1920.
1,377,258.   Patented May 10, 1921.
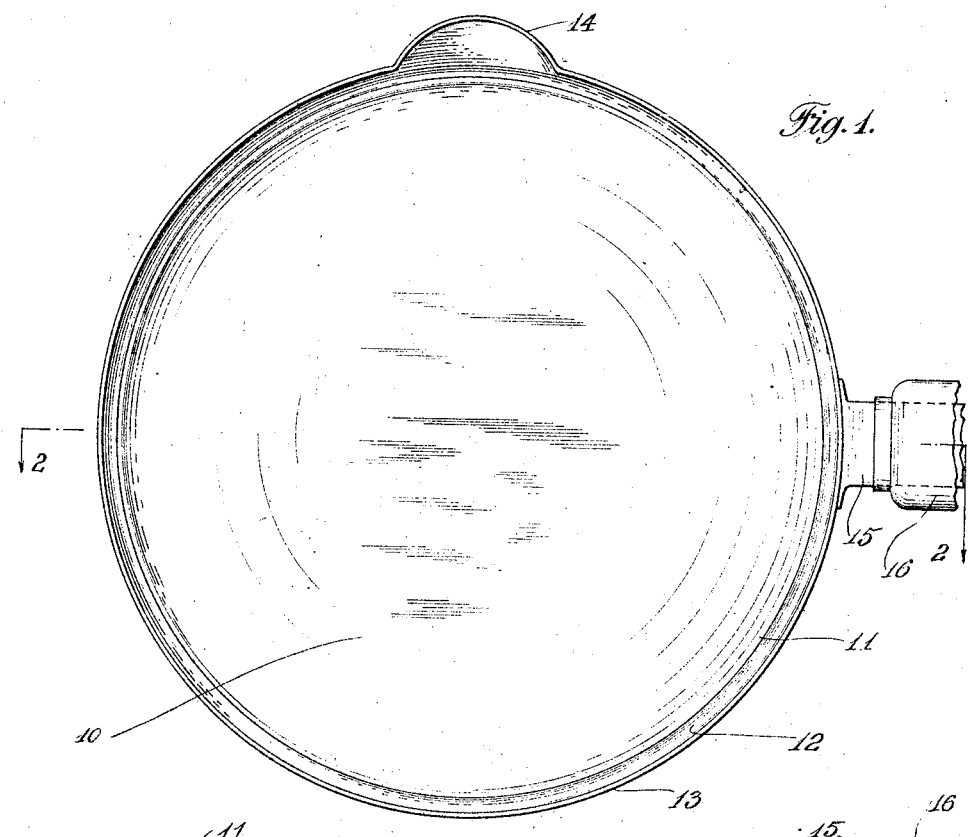
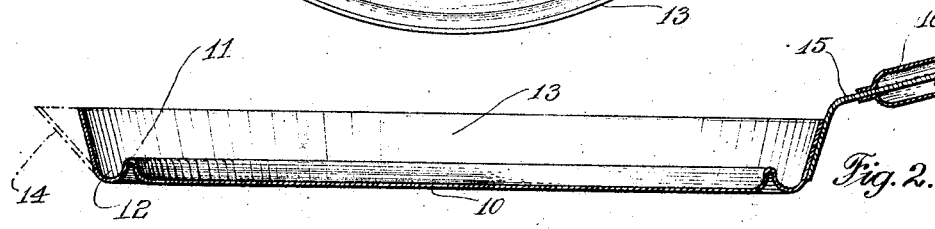
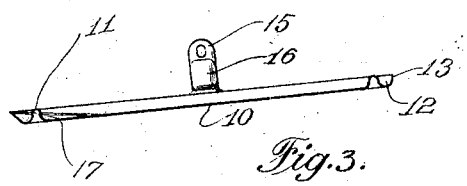
Inventor
Frank C. Lame
By by Attorney
Paul M. Klein

UNITED STATES PATENT OFFICE.

FRANK C. LAME, OF NEW YORK, N. Y.

COOKING UTENSIL.

1,377,258. Specification of Letters Patent. Patented May 10, 1921.

Application filed March 24, 1920. Serial No. 368,336.

*To all whom it may concern:*

Be it known that I, FRANK C. LAME, citizen of the United States, and resident of New York city, in the county of New York and State of New York, have invented certain new and useful Improvements in Cooking Utensils, of which the following is a specification.

This invention relates to cooking utensils, and particularly to the kind used for frying purposes.

The prime objects of my invention are to provide a new article of manufacture in culinary utensils which will enable the user to regulate within the utensil the amount of grease in which he chooses to fry eatables, in such a way as to either separate it from the latter or add more grease without pouring it out into another vessel or adding new grease from without.

Another object of my invention is to provide in such a new article of manufacture a double set of normally non-communicating vessels facilitating, when so desired, the transfer of grease from one vessel into the other or vice versa, thus making it possible to gather excessive grease in the one vessel not used for the actual frying, and saving it by pouring it off.

Still another object of my invention is to provide an article of this kind which will prevent the eatables frying from being easily scorched due to lack of grease. This is particularly the case with commonly used frying pans having an upright edge, and specially when exposed to an open flame.

The foregoing and other objects will be more fully apparent from the following description and from the accompanying drawings, forming part of this specification, in which:

Figure 1 is a top view of a preferred form of my device.

Fig. 2 is a sectional view taken on line 2—2 of Fig. 1.

Fig. 3 illustrates a diagrammatical view of my device in section 1 showing it in tilted position.

Referring to the drawings, 10 represents a dished bottom of substantially horizontal surface, having an upturned edge forming a rib or inner retaining wall 11. At the outer side of the rib, and surrounding the dished bottom 10 is a groove 12, which, in fact, represents an outer vessel. The outer edge of this groove forms the outer retaining wall 13, which may vary in shape and height. Extending outward from this wall and preferably forming a part thereof is a lip or spout 14. Disposed preferably at a right angle to the spout a handle 15 is attached to the outer retaining wall and is constructed in such a way as to provide a heat-isolating gripping surface indicated at 16.

While the drawings illustrate a circular shaped frying pan, be it understood that my device may be made in any desired form.

Similarly the proportion between the inner dished portion 10 of the vessel and the groove 12 and their shapes may be varied to suit different purposes.

My device is primarily designed for frying, and in order to explain its advantages, it is desirable to treat a concrete example, for instance preparing bacon and eggs. A quantity of bacon is placed in the heated dished portion 10. The issuing grease spreads upon its bottom and subsequently covers it and fills the inner vessel portion. The bacon, when left in the grease, would never become crisp however, and the excessive fat has to be poured off. Also the eggs now ready to be placed into the pan, when fried in too deep a grease, lose in taste and are not easily digestible.

By slightly tilting my device, the excessive fat gathers at one side of the bottom, as indicated at 17 in Fig. 3, and, when tilted still more, causes the grease to enter into the outer groove 12, from which it may be poured out by way of spout 14, leaving just the right amount in the inner vessel portion.

By quickly reversing the tilting operation the grease yet retained in the groove may be again transferred into the inner vessel portion if desired.

The height of the outer wall 13 is variable for different purposes for which my device may be used. I prefer however to construct it at least as high as or higher than the inner retaining wall or rib 11.

Having thus described my invention, and reserving for myself the right to make changes and improvements thereon, without departing from the broad scope of my idea, I claim:

1. In a new article of manufacture having a plain, circular dished bottom, an annular groove forming an integral part of and surrounding said bottom, an annular rib separating said bottom and said groove, said dished bottom being disposed in one plane with the bottom portion of said groove, a flaring flange extending upward from the outer portion of said groove, a spout provided in said flange, and means attached thereto for handling the article.

2. In a new article of manufacture, a culinary vessel comprising a plain, dished bottom portion, the edge of which forms a rib, a groove surrounding said rib, and forming an integral part of said bottom portion, said dished bottom portion and the bottom of said groove being disposed in one plane, the outer edge of said groove forming a flaring retaining wall, a spout built out from said retaining wall, and means attached to the latter for handling the vessel.

3. A cooking utensil comprising a plain, dished bottom center portion surrounded by a retaining groove, a rib formed between said dished bottom portion and one edge of said groove, the other groove edge forming an outer wall having a spout, said dished bottom portion and the bottom of said groove being disposed in one plane, and means attached to said wall for holding and tilting the utensil.

4. A culinary vessel having a plain, dished, inner bottom portion, an outer retaining flange having a spout, a groove between said dished bottom portion and said flange, said dished bottom portion and the bottom of said groove being disposed in one plane, a separating rib formed between said groove and the dished bottom portion, and means for handling said vessel.

5. A culinary utensil having a straight, dished bottom and surrounded by an annular groove, means for completely separating the contents in said bottom and in said groove when the utensil is in a horizontal plane, the outer part of said groove forming a retaining wall, said dished bottom being disposed in one plane with the bottom portion of said groove, a spout formed in said retaining wall, said retaining wall being at least as high as said separating wall, and means for handling said utensil.

6. A culinary utensil comprising a vessel having a plain, dished bottom surrounded by a non-communication groove, the bottom portion of which lies in a plane with the dished bottom and outer retaining flange surrounding the latter, and means for handling the utensil.

Signed at New York city, in the county of New York and State of New York, this 12th day of March, A. D. 1920.

FRANK C. LAME.